United States Patent

Arikawa et al.

[15] 3,688,967
[45] Sept. 5, 1972

[54] SOLID COMPOSITE BACKING STRUCTURE FOR SINGLE WELDING

[72] Inventors: Masayasu Arikawa, Fujisawa-shi; Hitosi Sioyama, Kamakura-shi, both of Japan

[73] Assignee: Kobe Steel Ltd., Kobe-shi, Japan

[22] Filed: April 24, 1967

[21] Appl. No.: 633,122

[30] Foreign Application Priority Data

May 9, 1966  Japan ..................... 41/29503

[52] U.S. Cl. .................. 228/50, 29/182.2, 29/491, 148/23
[51] Int. Cl. ................................. B23k 5/22
[58] Field of Search ....29/191.2, 182.2, 491; 228/50; 148/23, 26; 219/146; 75/94

[56] References Cited

UNITED STATES PATENTS

| 3,309,196 | 3/1967 | Kaneko et al. | 148/26 |
| 3,360,350 | 12/1967 | Sama | 29/197 |
| 3,432,915 | 3/1969 | Doyle | 228/50 |
| 2,331,937 | 10/1943 | Schreiner | 228/50 |
| 2,362,505 | 11/1944 | Smith | 228/50 |
| 2,558,411 | 6/1951 | Austin et al. | 228/50 |
| 2,820,427 | 1/1958 | Chyle et al. | 228/50 |
| 2,916,001 | 12/1959 | Chyle et al. | 228/50 |
| 2,616,384 | 11/1952 | McBride | 113/110 |
| 3,365,566 | 1/1968 | Kuder | 228/50 |
| 1,650,905 | 11/1927 | Mills | 113/116 |

*Primary Examiner*—John F. Campbell
*Assistant Examiner*—R. J. Craig
*Attorney*—Wenderoth, Lind & Ponack

[57] ABSTRACT

A backing material, for use in butt or fillet welding, adapted to be placed and retained under or behind a joint to improve the quality of the weld at the root, the structure being composed of layers of different granular fluxes solidified into a rigid formation.

3 Claims, 9 Drawing Figures

MASAYASU ARIKAWA AND
HITOSI SIOYAMA, INVENTORS

BY Wenderoth, Lind
and Ponack, Attorneys

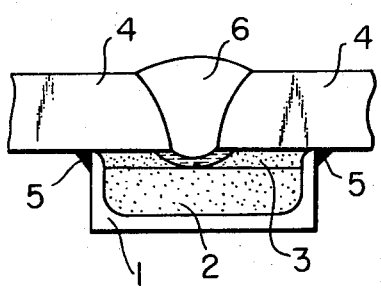
Fig. 7
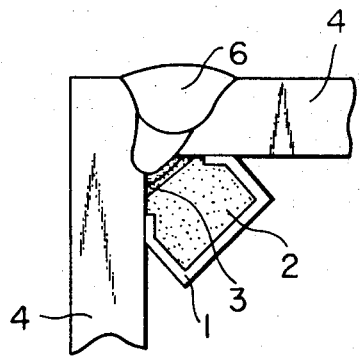
Fig. 8
Fig. 9
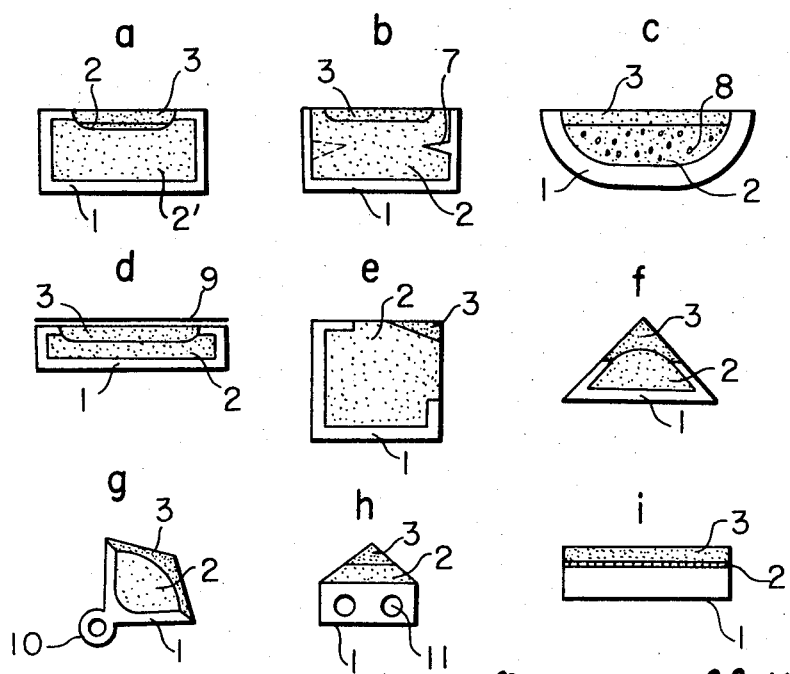

SOLID COMPOSITE BACKING STRUCTURE FOR SINGLE WELDING

CROSS REFERENCE TO RELATED APPLICATIONS

Reference is made to Japanese patent application No. 41/29,503, filed May 9, 1966.

BACKGROUND OF THE INVENTION

This invention relates to welding and in particular to solid composite backing structures for use in weld joints welded from a single side.

Hitherto, it has been extremely difficult to perform such single side welding on certain structures such as butt or fillet weld structures.

An object of the present invention is therefore to provide a solid composite backing structure for enabling such difficult welds to be made with ease and at a low cost.

As a means for backing a joint to be welded from one side only, it has been conventional to use a copper backing strip. However, such use had certain disadvantages and, consequently, a process was developed for overcoming such disadvantages by utilizing flux powder. However, the use of a loose powdered flux as a backing material is very inconvenient because it is difficult to handle and to spread uniformly in desired thickness so as to satisfactorily support the molten metal, and therefore this process is of little practical value.

SUMMARY OF THE INVENTION

The present invention provides a reliable and practicable backing structure which eliminates the defects in the use of flux powder while making the best use of the advantages of copper backing strips. The invention primarily resides in solidifying the welding flux to a rigid formation by which the weld metal can be supported lining the solidified welding flux layer with a second layer of similarly solidified refractory material so as to endow the backing structure with a fireproof property and thereby enhance the slag producing faculty of the welding flux.

Thus, the present invention provides a solid composite backing structure for use on single side welded joints which comprises a of welding flux layer and a refractory flux layer, said welding flux layer being in the form of a solid body backed with a said refractory flux layer which is also in the form of a solid body, the free surface of said welding flux layer being the backing surface of said structure. The present invention also provides a solid composite backing structure for single side welding which comprises a welding flux layer, a refractory flux layer and a metallic support therefor, said refractory flux layer being in the form of a solid body which is retained by said metallic support, and said welding flux layer being similarly solidified and lined with the refractory flux layer, one face of said welding flux layer serving as a backing surface.

The terms "welding flux layer" and "refractory flux layer" as employed in the application refer, respectively, to a solid body prepared either from compound flux powders usually employed as welding flux to form a material which melts at the welding temperature of the metals to be joined together and to a solid body prepared from the addition of a refractory component to a conventional welding flux component or a solid mass of refractory material which does not melt at the welding temperature of the metals to be joined together.

For example, the materials mixed for composing the welding flux layer according to this invention are inorganic compounds, such as $SiO_2$, $Al_2O_3$, CaO, MgO, $ZrO_2$, $TiO_2$, $MnO_2$, BaO, $CaCO_3$, $BaCO_3$, $MgCO_3$, CaF, etc., while the materials assorted for composing the refractory flux layer consist mainly of refractory materials, such as MgO, $Al_2O_3$, $SiO_2$ and the like. These materials are formed into desired shapes by addition of water glass, bentonite, or other suitable binders, and are then solidified.

Further objects and advantages of this invention will further become apparent from the following detailed description and from the accompanying drawings.

BRIEF DESCRIPTION OF THE DRAWINGS

FIGS. 7 and 8 are sectional views of the embodiments of FIGS. 5 and 6 as applied to two different types of welds; and FIG. 9 is a plurality of sectional views illustrating further embodiments of this invention.

DESCRIPTION OF THE ILLUSTRATED EMBODIMENTS

Figure 1:
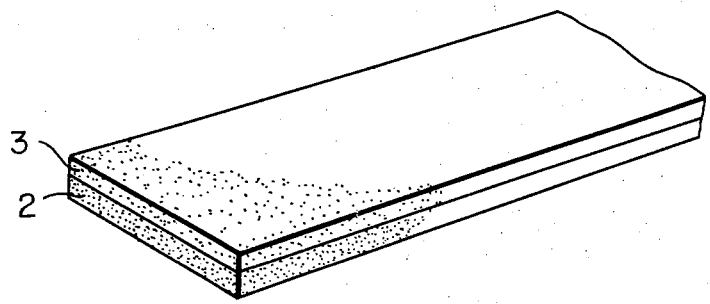
FIG. 1 is a perspective view of one embodiment of the weld backing structure in accordance with the present invention.
Figure 2:
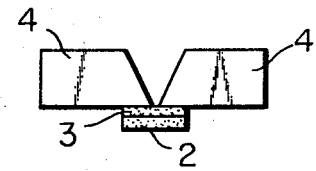
FIG. 2 is a sectional view of the backing strip of FIG. 1 as applied to a single-V groove weld.

Referring to FIG. 1, an embodiment of the invention is shown having a solid refractory flux layer 2 and a solid welding flux layer 3, said layers being of appropriate thickness and placed one upon the other so as to form a unitary construction. In FIG. 2, the backing structure of FIG. 1 is shown as applied to the root opening of metal members 4 to be welded, with the upper face of the welding flux layer 3 placed behind said opening and in contact with the under faces of the members 4. This backing structure can be secured to the metal members in a suitable manner, for example, by tacking welds 5 (FIG. 7) or by securing with ribs. It may be supported by separate sheet metals and then secured by a suitable jig fixture. Alternatively, it may be secured by employing an adhesive tape which is made to stick on the back face of the parent metal members.

With the above arrangement, the welding operation may be performed from the upper side of the joint (see FIGS. 7 and 8.). In the welding operation, the tendency of the molten metal 6 to flow down to the back side of the joint will produce pressure on that portion of welding flux layer 3 which has been molten and converted to "slag" by the welding heat, and consequently, this supporting action serves to produce a better appearing and smother back weld or "reverse bead" formation.

In the use of the backing structures of this invention in a welding operation, it will be apparent that, even when for welding arc digs extremely deeply into the root of the joint, the molten metal nevertheless may be well supported by the refractory flux layer 2 disposed underneath the welding flux layer 3, and thus any serious damage can be entirely avoided.

By suitably selecting or controlling the thickness of the welding flux layer 3, the depth of the slag produced during the welding operation can be controlled and thus the height of excess metal of a "reverse bead" can be regulated easily as desired.

In addition to the above, this invention has a further advantage in that, even if the welding arc is so varied during the operation as to seriously change the melting action, or if the welding is performed under such severe conditions that surplus molten metal is produced rapidly, the uniformity of the "reverse bead" is, nevertheless, maintained.

Figure 3:
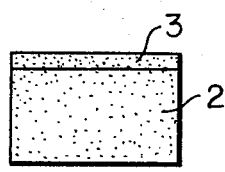
FIGS. 3 and 4 are sectional views of further embodiments of this invention.
Figure 4:
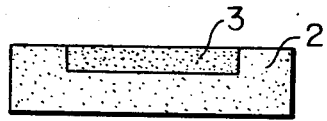

FIGS. 3 and 4 show modifications of the compound backing structure shown in FIG. 1.

Figure 5:
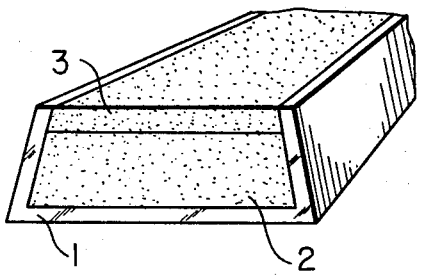
FIGS. 5 and 6 are perspective views of still further embodiments of this invention.

FIGS. 5 and 7 illustrate another modification of the present invention, wherein a metal supporting member is added for the purpose of reinforcement. As shown in FIG. 5, metal casing 1 of channel shaped iron is filled with refractory flux layer 2 at the bottom and on said layer 2 is superposed welding flux layer 3. Preferably the surface of layer 3 is flush with the top edge of metal casing 1. The top face of welding flux layer 3 is exposed at the opening of casing 1, while refractory flux layer 2 is embedded within the casing. FIG. 7 shows an application of this type of backing strip to a butt joint weld wherein two metal members 4 are to be welded together.

Figure 6:
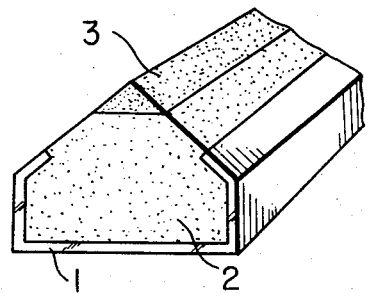

Solid backing structures according to this invention can similarly be employed in fillet welds for such types of joints as T, V or the like. FIG. 6 exemplifies one form of a solid backing structure particularly adapted for use in fillet welds. As shown in FIG. 6, refractory flux layer 2 is secured rigidly in metal casing 1, and on top of said layer 2 is fixedly mounted welding flux layer 3 which takes the form of a triangular prism. This backing structure can also be utilized without addition of metal casing 1. FIG. 8 shows an application of this type of backing structure to a fillet weld. The bevelled faces of the backing structure shown in FIG. 6 are brought firmly into contact with the corresponding back faces of the metal members 4, as is clear from FIG. 8, and retained in this position by any suitable means (not shown). The weld is now made from one side of the joint. The, welding flux layer 3 becomes partially slagged by the action of the welding heat and thus serves to control the shape of the "reverse bead."

It will be apparent that the above backing structure can be used with flexibility for other joints joint modified, in any other corner joint, such as for example a "surf" joint, i.e. wherein two plates of widely different thicknesses are to be joined together, or corrugated bulkheads wherein the plates to be welded are positioned at various angles with each other.

FIG. 9 is a series of illustrations, a to i, showing further modifications of the backing structure of the present invention. As shown in a, a part at the bottom of the refractory flux layer 2 has been replaced with a different refractory material 2' which is cheaper and more hygroscopic. Alternatively, this part 2' may be entirely eliminated so as to form a cavity therein and the bottom side of layer 2 is retained by a supporting plate. In b, metal casing 1 is provided with inwardly projecting spikes 7 for retaining refractory layer 3 in place so that it is particularly adapted to resist vibrations and impact. In c, metal casing 1 is formed in the sectional shape of an arcuate cup and the refractory flux layer 2 has incorporated therein a suitable amount of metallic powder 8 for improving its thermal and physical properties. In d, a sheet of film 9, such as cellophane or the like, is attached to the top surface of welding flux layer 3 to render the strip anti-hyposcopic and at the same time to make it easy to handle as well as to minimize accidental breakage. In e, two exposed faces of refractory flux layer 2 make a right angle with each other and a prismatic portion thereof is replaced with welding flux layer 3 having dissimilar sides exposed so that it may be convenient for use in fillet welds having different leg lengths In f, a modification of the structure shown in FIG. 6 is illustrated. Two side walls of metal casing 1 are directly coupled to the ends of a V-shaped section of welding flux layer 3 so that refractory flux layer 2 is completely covered thereby. The top angle of said layer 3 may either be obtuse or even arcuate instead of rectangular. In g, a suitable fitting means 10 is provided on metal casing 2 for easy handling of the structure. In h, metal bar 1 is provided with holes 11 extending therethrough either for connecting two or more structures together or for facilitating conveyance or attachment by use of wire, etc. In i, there is shown a backing structure particularly adapted for use in the field where the workpieces to be welded vary widely in size and shape. As a metal support, a piece of sheet steel 1 is utilized, the surface of which is coated with refractory compounds in the form of a solution, which is then dried to form a solid refractory flux layer 2. Afterwards, welding flux layer 3 is stuck on top of layer 2 firmly to construct a unitary formation. The structure produced as above may be used by simply forming it to any desired shape according to the needs of the workpieces to be welded in the field.

While the invention has been described in its presently preferred forms, it is to be realized that many changes to the instant embodiments may be made without departing from the scope and concept of the invention.

The following is claimed:

1. A solid composite backing structure for use in the welding of joints effected from a single side comprising a welding flux layer having the property of being meltable and convertible to slag by welding heat and a refractory flux layer being capable of supporting thereon molten metal due to welding heat without being melted by welding heat wherein said welding flux layer is in the form of a single solid body formed from compound flux powders which are solidified by the inclusion therein of binders and said refractory flux layer is similarly in the form of a single solid body formed from refractory flux powders which are solidified by the inclusion of binders and further provided that said welding flux layer is attached to and supported by said refractory flux layer such that the free surface of the welding flux layer constitutes the backing surface of the composite structure.

2. A solid composite backing structure as claimed in claim 1 wherein said binders included in the welding flux layer are taken from the group consisting of water glass and bentonite and wherein said binders included in the refractory flux layer are taken from the group consisting of water glass and bentonite.

3. A solid composite backing structure as claimed in claim 1 wherein said refractory flux layer is supported by a metallic support.

* * * * *